United States Patent
Bertram et al.

(10) Patent No.: US 6,369,820 B1
(45) Date of Patent: Apr. 9, 2002

(54) METHOD AND SYSTEM FOR GRAPHICALLY DISPLAYING TREND AND RANGE DATA FOR A VARIETY OF SYSTEMS

(75) Inventors: Randal Lee Bertram; Frederick Scott Hunter Krauss, both of Raleigh; Margherita LaFauci, Holly Springs; Thomas John Sluchak, Apex, all of NC (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/088,525

(22) Filed: Jun. 2, 1998

(51) Int. Cl.$^7$ ............................................. G06F 15/00
(52) U.S. Cl. ..................... 345/440; 345/736; 709/223; 709/224
(58) Field of Search .................. 345/440, 1, 2, 345/117, 133, 134, 1.2, 115, 503, 140, 440.2, 734–736, 440.1, 619; 707/2, 5, 100, 218–224; 709/200; 700/1, 83; 425/144, 145, 149, 150, 152; 264/40.6

(56) References Cited

U.S. PATENT DOCUMENTS

| | | | | |
|---|---|---|---|---|
| 5,470,218 A | * | 11/1995 | Hillman | 425/144 |
| 5,684,507 A | * | 11/1997 | Rasnake et al. | 345/134 |
| 5,734,591 A | * | 3/1998 | Yundt | 345/440 |
| 5,777,598 A | * | 7/1998 | Gowda et al. | 345/440 |
| 5,872,722 A | * | 2/1999 | Oravetz | 345/440 |
| 5,886,709 A | * | 3/1999 | William | 345/440 |
| 5,917,499 A | * | 6/1999 | Jancke | 345/440 |
| 6,026,397 A | * | 2/2000 | Sheppard | 707/5 |

FOREIGN PATENT DOCUMENTS

| | | | | |
|---|---|---|---|---|
| EP | 1079208 | * | 2/2001 | G01D/7/02 |
| JP | 410063550 | * | 3/1998 | G06F/11/34 |
| JP | 410105607 | * | 4/1998 | G06F/17/60 |
| JP | 411248840 | * | 9/1999 | G01T/1/00 |

OTHER PUBLICATIONS

Dynamic Performance Monitoring Accross A Network, IBM Technical Disclosure Buletin, Jun. 1, 1993, pp. 13–14.*

* cited by examiner

Primary Examiner—Matthew Luu
Assistant Examiner—Wesner Sajous
(74) Attorney, Agent, or Firm—Joscelyn G. Cockburn

(57) ABSTRACT

A system and method for graphically displaying data from a plurality of selected data sets on a computer system including a display is disclosed. Each selected data set has a plurality of values corresponding to a plurality of parameter values. The method and system include determining a plurality of average values for a plurality of intervals. The plurality of average values are determined for each selected data set. Each of the plurality of average values is determined from a portion of the plurality of values. The portion of the plurality of values correspond to an interval of the plurality of intervals. Each of the plurality of intervals includes a portion of the plurality of parameter values. The method and system further include plotting the average value for each of the plurality of intervals on the display for each selected data set. The average value is depicted as a first symbol.

16 Claims, 9 Drawing Sheets

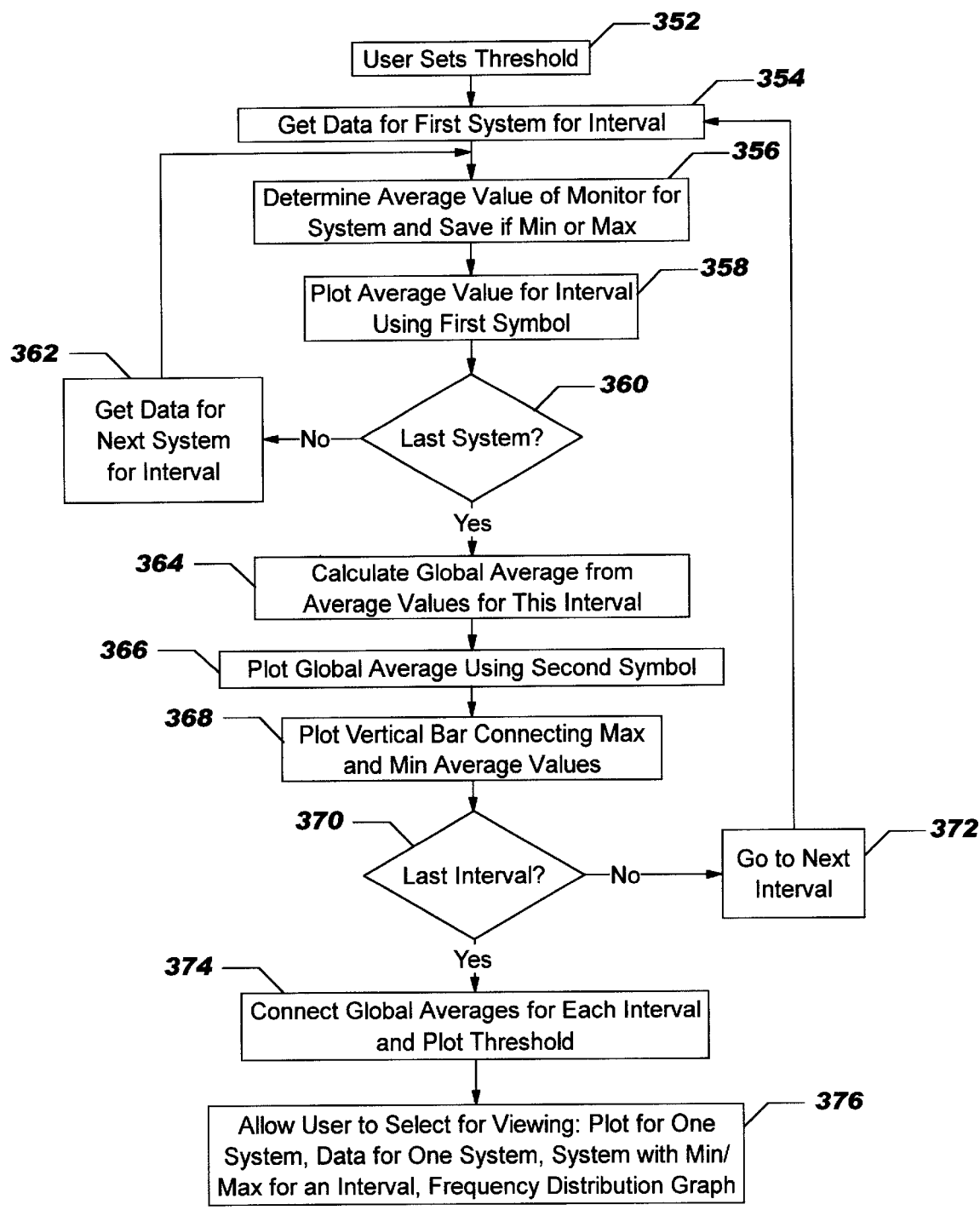

220

Range of Monitor

METHOD AND SYSTEM FOR GRAPHICALLY DISPLAYING TREND AND RANGE DATA FOR A VARIETY OF SYSTEMS

FIELD OF THE INVENTION

The present invention relates to graphical display of trends in data, particularly for capacity management, and more particularly to a method and system for displaying data for a plurality of systems without unduly cluttering a user interface.

BACKGROUND OF THE INVENTION

A user often wishes to view trends in data versus a particular parameter, such as time. Typically, a user views trends by plotting the data versus the parameter. The data is typically the ordinate on the graph, while the parameter is typically the abscissa. Often, a user is also interested in comparing trends between systems. In order to compare systems, data for each system is often plotted versus the parameter. The points representing a particular system are often represented by a unique symbol and connected in order to indicate set off data for that system.

For example, capacity management is of increasing interest for a network containing a plurality of systems. Capacity management refers to the monitoring of the network in order to ensure that the network can function. The network may contain servers, computer systems for individual users of the network, mainframes, printers, or other systems. Depending on the size of the network, the network could be made up of only a few systems or thousands of systems. A user known as a network administrator is typically responsible for ensuring that individual portions of the network function and that the network as a whole functions.

In order to ensure that the network functions, the network administrator keeps track of monitors for each system. A monitor is an attribute of a particular system. For example, a monitor for a particular system could be central processing unit ("CPU") utilization, disk space available, disk work load, the number of bytes sent by the system, and the number of bytes received by the system.

Applications allow a user such as a system administrator to query the systems within the network and receive information relating to each system's monitors. Once the data relating to the monitors are received, a network administrator typically displays the data on a display for the network administrator's system.

The network administrator is often interested in determining how each system within the network and how the network as a whole functions over time. In particular, the network administrator typically desires information regarding short-term and long-term trends in performance, the identity of servers performing well or performing poorly, and a comparison of the performance of different systems. In order to determine trends in the network's behavior, the system administrator may generate plots of one monitor for a system versus time to be shown on the system administrator's display. In order to compare how systems in the network are functioning, the network administrator may plot a monitor for many systems in the network versus time.

Although plotting a monitor for systems in the network graphically displays information to the network administrator, it may be difficult to extract useful information from such a graph. Where the number of systems is large, the graph becomes cluttered. Even where different symbols are used to plot the monitor for different systems, it may be difficult for the network administrator to determine trends for individual systems or the network as a whole. It is also difficult to determine which system, if any, has exceeded established operating parameters for the network. Therefore, it may be difficult for the network administrator to determine which systems are performing well or performing poorly.

Accordingly, what is needed is a system and method for graphically displaying data for a plurality of systems without unduly cluttering the display. The present invention addresses such a need.

SUMMARY OF THE INVENTION

The present invention provides a method and system for graphically displaying data from a plurality of selected data sets on a computer system including a display. Each selected data set has a plurality of values corresponding to a plurality of parameter values. The method and system comprise determining a plurality of average values for a plurality of intervals. The plurality of average values are determined for each selected data set. Each of the plurality of average values is determined from a portion of the plurality of values. The portion of the plurality of values correspond to an interval of the plurality of intervals. Each of the plurality of intervals includes a portion of the plurality of parameter values. The method and system further comprise plotting the average value for each of the plurality of intervals on the display for each selected data set. The average value is depicted as a first symbol.

According to the system and method disclosed herein, the present invention allows a user to more easily extract information from the display, thereby increasing overall system performance.

BRIEF DESCRIPTION OF THE DRAWINGS

FIG. 3D is a flow chart of another embodiment of the method for graphically displaying data for a plurality of systems.

DETAILED DESCRIPTION OF THE INVENTION

The present invention relates to an improvement in graphical display of data, particularly for capacity management. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

Figure 1A:
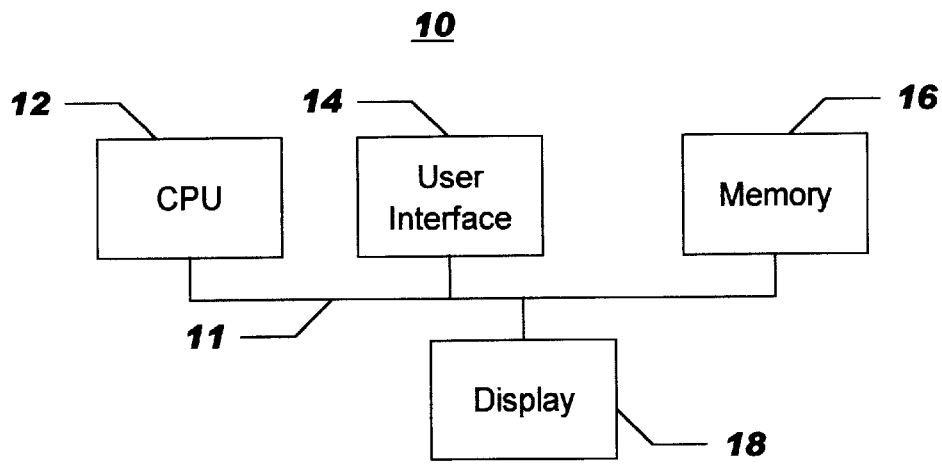
FIG. 1A is a block diagram of a computer system.

FIG. 1A is a block diagram of a computer system 10 in which the present invention can be used. The computer system 10 includes a central processing unit ("CPU") 12 coupled to a system bus 11. Also coupled to the system bus 11 are a user interface 14, a memory 16, and a display 18. Through the user interface 14, the user can input information to the computer system 10. The display 18 allows the user to view information, for example in table form.

Figure 1B:
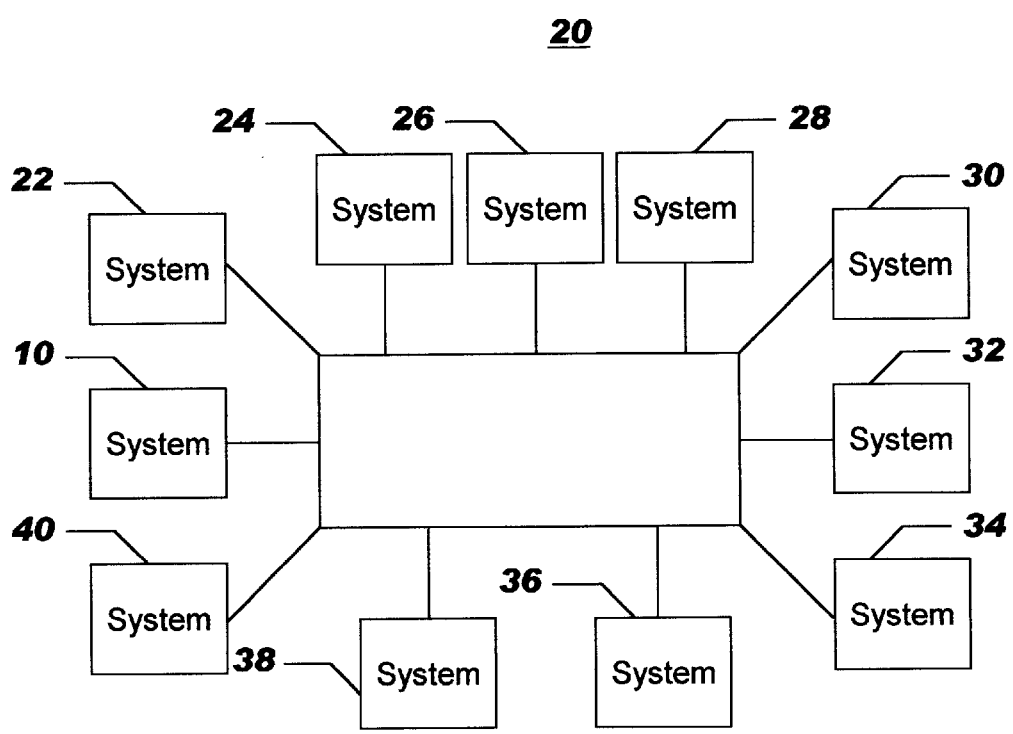
FIG. 1B is a block diagram of a network in which the computer system may reside.

FIG. 1B depicts a network 20 in which the computer system 10 might reside. The network 20 also includes systems 10, 22, 24, 26, 28, 30, 32, 34, 36, 38, and 40. The systems 22 through 40 could include other computer systems, servers, printers, or other apparatus. Although depicted as including eleven systems 10 and 22–40, the network 20 could include any number of systems, from one system to thousands of systems, or more.

Referring to FIGS. 1A and 1B, a user of the system 10 may wish to view data on the display 18. For example, suppose the user of the system 10, such as a network administrator, is interested in capacity management. The user may wish to view data relating to each of the systems 10 and 22–40 on the display 18. In order to ensure that the network 20 functions, the user keeps track of monitors for each system 10, and 22–40. A monitor is an attribute of a particular system 10, and 22–40. For example, monitors include CPU utilization, disk space available, the number of bytes sent by the system, and the number of bytes received by the system.

Applications, not shown, allow a user to query each system 10 and 22–40 and receive information relating to each system's monitors. Typically, each system 10 and 22–40 saves data for the monitor at specific time periods. When the user requests data for a monitor, the system 10 and 22–40 provide the data that has been saved to the user's system 10.

Once the data relating to the monitors are received, a user such as a network administrator typically desires to view the data on the display 18. One way of displaying this data is in the form of a graph of the monitor versus time. Thus, values of the monitor are typically the ordinate values while time is typically the parameter used for the abscissa. Some applications allow a user to plot the monitor versus time for a single system. In the context of this application, "plotting" refers to graphically providing a value to the display 18. The user may wish to view trends in systems 10 and 22–40. Thus, some conventional applications may allow plots to be made for the monitor of several systems 10 and 22–40.

Figure 2:
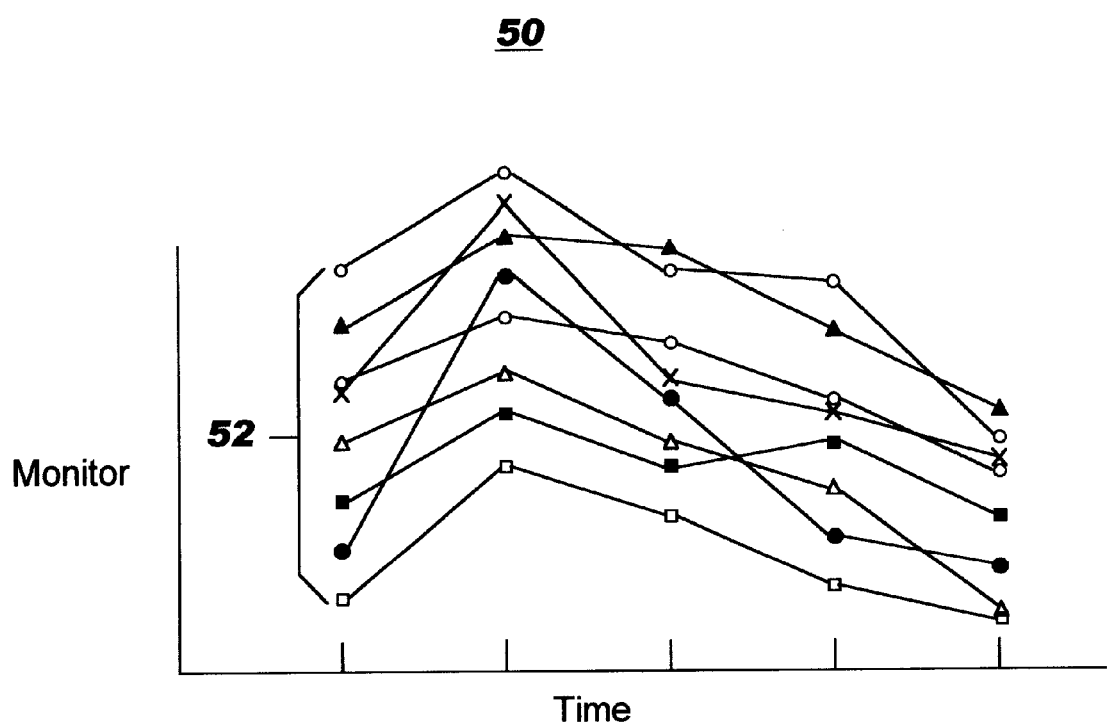
FIG. 2 is a graphical display of a monitor versus time for several systems.

FIG. 2 depicts a graph 50 having a monitor as an ordinate and time as the abscissa. The graph 50 includes plots 52 for eight of the systems in the network 20. By using the graph 50, the user can determine how each of the eight systems behave versus time. In addition, each of the eight plots 52 is denoted with a different symbol.

Although available applications allow the user to view the values of the monitor versus time, one of ordinary skill in the art will realize that some applications only plot the monitor versus time for a single system. As a result, the user may be unable to determine trends for the network 20 as a whole. In addition, it may be difficult for a user to compare the monitor for two systems.

Even conventional systems which allow the user to the place plots for several systems on the same graph are problematic. Thus, referring back to FIG. 2, those with ordinary skill in the art will realize that it is difficult to extract information from the graph 50 because the display 18 is cluttered. For example, it may be difficult to accurately determine trends for the network as a whole. In addition, it may be difficult to discern to which system a particular point corresponds. It may also be difficult to determine which systems exceed a threshold set for a particular monitor, such as disk workload. This is true in FIG. 2, where plots 52 for only eight of the eleven systems 10 and 22–40 are shown. It appears that the problems discussed above are apparent when more than six plots are placed on the same graph. The difficulty in extracting information from the graph 50 will increase as the number of plots increases. Where the user is interested in the monitor for a large number of systems, it becomes virtually impossible to use a graph 50 such as that shown in FIG. 2.

The present invention provides for a method and system for displaying data for a plurality of selected data sets without unduly cluttering the display. The present invention will be described in terms of a method and system for use in conjunction with capacity management. However, one of ordinary skill in the art will readily recognize that this method and system will operate effectively for other types of areas in which graphical display of information from a plurality of selected data sets is desired. In addition, the present invention will be described in the context of a particular network 20. However, one of ordinary skill in the art will readily realize that the present invention operates effectively for other networks having another number or other types of systems. In addition, the method and system will be described as calculating an average of a plurality of values. However, one of ordinary skill in the art will readily realize that the method and system function effectively for other functions of the plurality of values. Consequently, in the context of this application, "average" may refer to some function of a portion of the plurality of values. The method and system will also be described in the context of a data set including a monitor. However, one of ordinary skill in the art will readily realize that the method and system are fully applicable to data sets including multiple monitors.

The present invention provides a method and system for graphically displaying data from a plurality of selected data sets on a computer system including a display. Each selected data set has a plurality of values corresponding to a plurality of parameter values. The method and system comprise determining a plurality of average values for a plurality of intervals. The plurality of average values are determined for each selected data set. Each of the plurality of average values is determined from a portion of the plurality of values. The portion of the plurality of values correspond to an interval of the plurality of intervals. Each of the plurality of intervals includes a portion of the plurality of parameter values. The method and system further comprise plotting the average value for each of the plurality of intervals on the display for each selected data set. The average value is depicted as a first symbol. In one aspect, the method and system also comprise determining a global average from the average value of each of the plurality of selected data sets for each of the plurality of intervals. In this aspect, the method and system further comprise plotting the global average for each of the plurality of intervals on the display as a second symbol. The method and system also include connecting the second symbol for each of the plurality of intervals with the second symbol from a previous interval of the plurality of intervals. Further in another aspect, the method and system comprise allowing a user to: graphically view a plot for a single system, graphically view a threshold value, view a frequency graph, and select when the method and system are invoked.

The method and system in accordance with the present invention could be used with the system 10 and the network 20. Thus, the method and system in accordance with the present invention are useful when graphically displaying a monitor for some number of the systems 10 and 22–40 in the network 20. In addition, the method and system are particularly useful where the number of systems 10 and 22–40 in the network 20 is large.

Figure 3A:
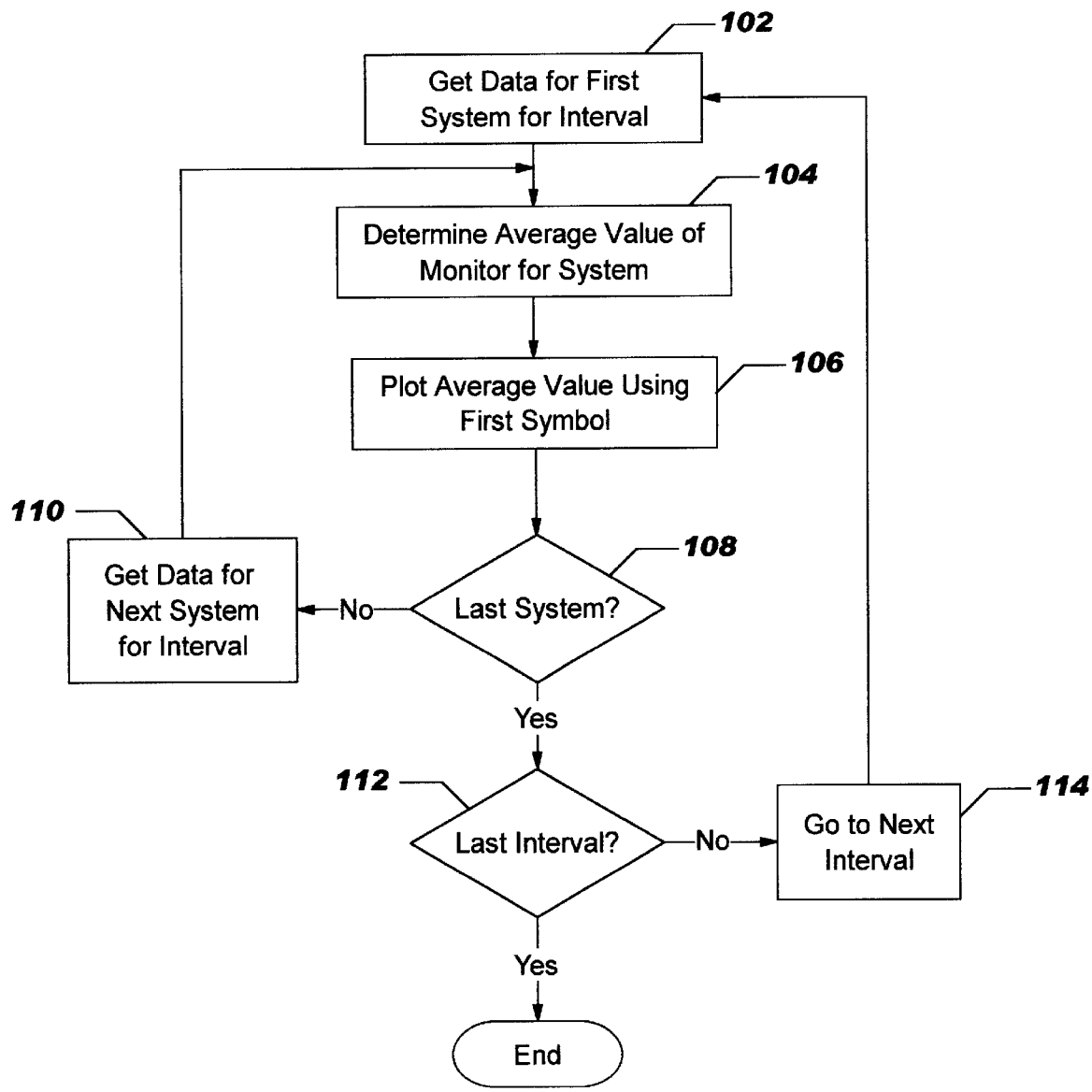
FIG. 3A is a flow chart of one embodiment of a method for graphically displaying data for a plurality of systems.

To more particularly illustrate the method and system in accordance with the present invention, refer now to FIG. 3A depicting one embodiment of a method 100 for graphically displaying data relating to a plurality of systems, such as a portion of the systems 10 and 22–40. Each system 10 or 22–40 may have a data set associated with it. In a preferred embodiment, the user, such as a network administrator, selects the systems 10 or 22–40 which are of interest. The method 100 will be performed for those selected systems. Preferably, the data set for a particular system 10 and 22–40 includes a plurality of values for at least one monitor. The monitor will be graphed versus a parameter. A user is often interested in trends. Consequently, in a preferred embodiment, the parameter is time. Thus, a data set preferably contains the values of a monitor corresponding to particular times. In a preferred embodiment, the method 100 is carried out by software residing on the user's system 10. Consequently, a mainframe (not shown) is not required.

The method 100 graphically displays average values of the monitor for a portion of the systems 10 and 22–40 versus time intervals. Each average value is calculated over the time interval, such as a day or a week. Preferably, the user selects the interval. In a preferred embodiment, the user also selects the total amount of time, or number of intervals, in each data set. The values for a first system 10 or 22–40 for a first interval are retrieved via step 102. In one embodiment, step 102 includes getting the values of the monitor for a particular system 10 or 22–40 over a particular time interval. The average value of the monitor for the first system is calculated via step 104. Preferably, the average value calculated is an average of the monitor versus time. However, the method 100 can be used to determine other functions of the monitor. Consequently, in the context of this application, the term "average value" can be another function of the monitor calculated over the interval.

The average value is plotted on the display 18 using a first symbol via step 106. In a preferred embodiment, the first symbol is a dash. Also in a preferred embodiment, the first symbol is an icon. The icon could provide added functionality to the user. For example, data relating to the system 10 or 22–40 could be displayed when a user selects the icon corresponding to the system 10 or 22–40. This data could include the identity of a particular system 10 or 22–40 corresponding to the icon selected. In a preferred embodiment, the average value is plotted in a particular window (not shown) on the display 18. A user, therefore, may be able to view different information on different windows on the display 18.

Via step 108, it is determined if the system 10 or 22–40 for which the average value was just plotted is the last system to be plotted for the interval. If the system 10 or 22–40 was not the last system to be plotted for the interval, then via step 110, data for the next system 10 or 22–40 is retrieved via step 110. Steps 104 through 108 are then repeated. As a result, the average value of the monitor for the interval is plotted using a first symbol for each system 10 or 22–40 of interest.

If it is determined in step 108 that the average value for the last system has been plotted, then via step 112 it is determined if average values for the last interval have been plotted. If the average values for the last interval have not been plotted, then the method 100 moves to the next interval via step 114. Steps 102 through 114 are then repeated for the interval. If it is determined in step 112 that data for the last interval has been plotted, then the method 100 ends. Thus, average values for each system 10 and 22–40 are plotted on the display 18 by the method 100. By viewing the density of dashes, the first symbol, at each interval, the user can compare the performance of the systems 10 or 22–40 which are of interest.

Figure 3B:
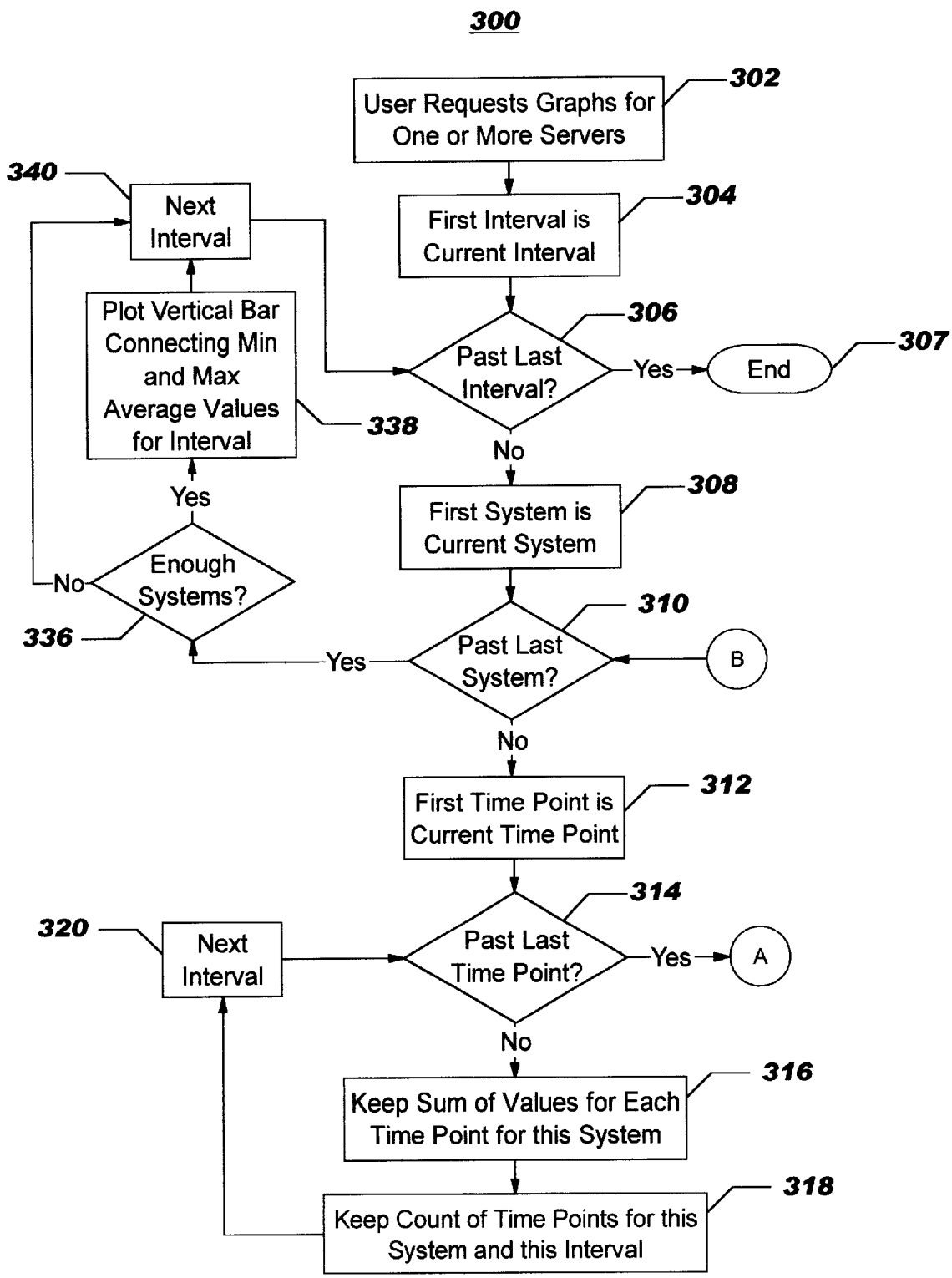
FIG. 3B is a portion of a more detailed flow chart of an embodiment of a method for graphically displaying data for a plurality of systems.
Figure 3C:
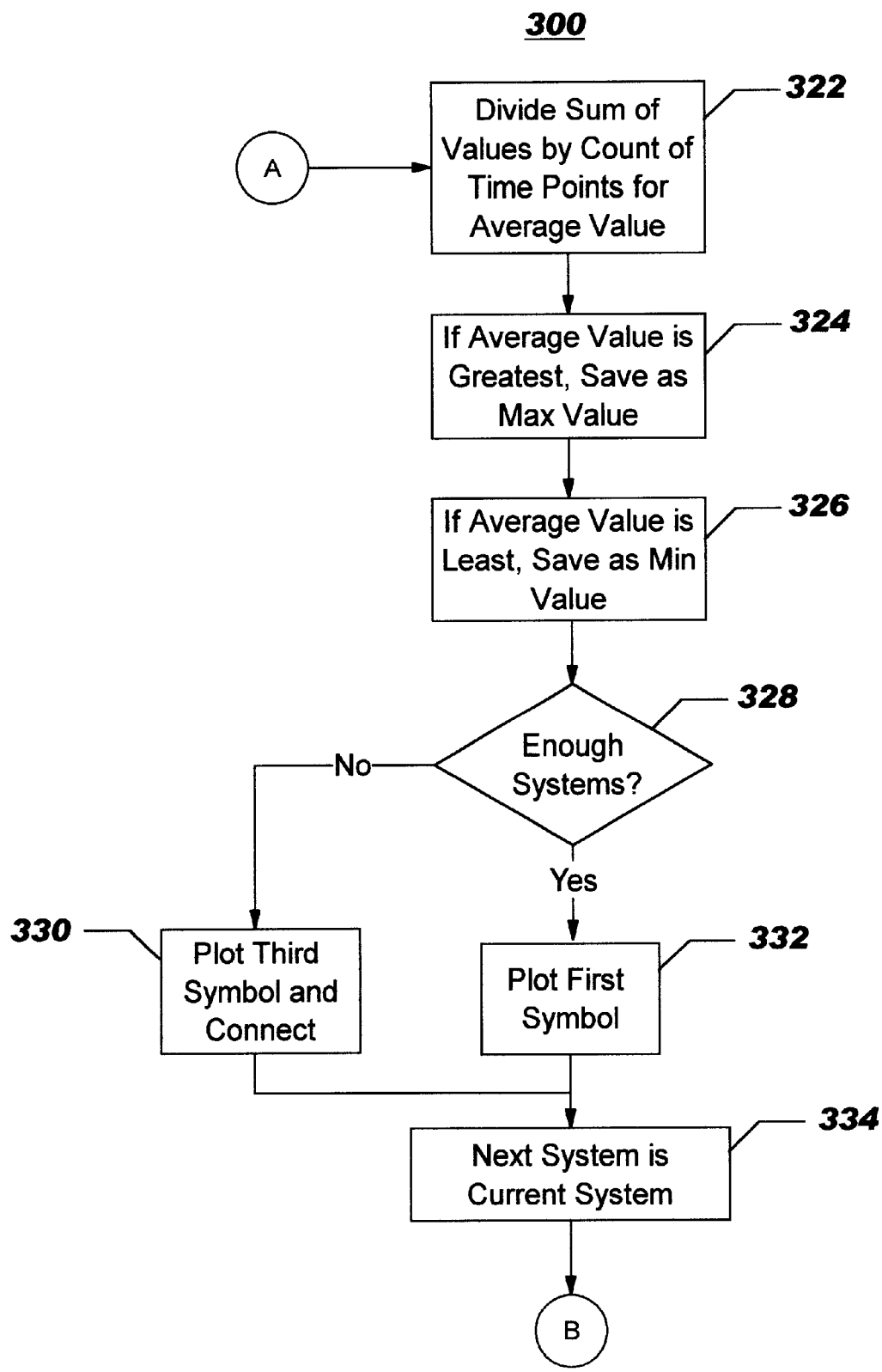
FIG. 3C is the remaining portion of the more detailed flow chart depicted in FIG. 3B.

FIGS. 3B and 3C depict a more detailed flow chart of one embodiment 300 of the method for graphically displaying data relating to a plurality of systems 10 and 22–40 previously discussed. In addition to plotting the average value for each system 10 or 22–40 selected for each interval, the method 300 also plots a vertical bar to connect the average values for each interval. In addition, the method 300 only generates a plot discussed with respect to the methods 100 and 300 when a sufficient number of systems 10 and 22–40 have been selected by the user.

The user requests graphs for one or more systems 10 and 22–40 via step 302. Thus, only data for such user selected systems 10 and 22–40 will be graphically displayed. The first interval is then made the current interval via step 304. It is then determined if the current interval is past the last interval to be graphed. If the current interval is past the last interval, then the method 300 is terminated via step 307. If, however, the current interval is not past the last interval, then the first system 10 or 22–40 is made the current system via step 308.

It is then determined if the current system is past the last system, in step 310. If the current system is not past the last system, the data for the first time point in the interval is retrieved via step 312. It is then determined via step 314 if the current time point is past the last time point. If the current time point is not past the last time point for the interval then a sum of values for each time point in the interval for the current system is saved via step 316. A count of the number of time points in this interval for the current system is then kept via step 318. Data for the next time point is then retrieved via step 320. Step 314 is then returned to. Steps 314 through 320 are then repeated until data for all time points in the current interval for the current system have been saved.

When data for all time points in the interval for the current system have been saved, in step 314 it will be determined that the current time point is past the last time point. The sum of the values is then divided by the number of time point to obtain the average value for this system for this interval, via step 322 (shown in FIG. 3C). If the average value just calculated is the greatest calculated for the current interval, then in step 324 the average value just calculated is saved as the maximum value for this interval. If the average value just calculated is the smallest calculated for the current interval, then in step 326 the average value just calculated is saved as the minimum value for this interval.

It is then determined via step 328 if the number of systems 10 or 22–40 selected by the user is great enough so that the data should not be plotted as in FIG. 2. In a preferred embodiment, step 328 is performed by determining if the number of systems 10 or 22–40 exceeds a particular number of systems. Preferably, the particular number is on the order of six. If the number of systems 10 or 22–40 selected is less then the particular number, then the average value is plotted as third symbol via step 330. In a preferred embodiment, for each system 10 or 22–40 that is plotted using the step 330, a different symbol is used. The next system 10 or 22–40 is then selected as the current system via step 334.

If, however, it is determined in step 328 that there are a sufficient number of systems 10 or 22–40 selected, then via step 332 the first symbol is plotted in the window on the display 18. In a preferred embodiment, the first symbol is a dash and is an icon. The next system 10 or 22–40 is then set as the current system via step 334.

After step 334 is performed, then the method 300 returns to step 310 of FIG. 3B. Steps 310 through 334 are then repeated until an average value for the current interval has been plotted for each system selected. Once it is determined in step 310 that the last system has been plotted, then via step 336 it is determined if the number of systems 10 or 22–40 selected by the user is great enough so that the data should not be plotted as in FIG. 2. In a preferred embodiment, step 336 is performed by determining if the number of systems 10 or 22–40 exceeds a particular number of systems. If the number of systems 10 or 22–40 exceeds the particular number, then via step 338 the vertical bar is drawn to connect the minimum and maximum average values for the interval. The next interval is then set as the current interval via step 340. The method 300 then returns to step 306. Steps 306 through 340 are then repeated until data for all of the intervals have been plotted. Thus, the average value for each interval as well as the minimum and maximum average values may be plotted.

FIG. 3D depicts a flow chart of another embodiment of a method 350 for graphically displaying data relating to a plurality of systems, such as a portion of the systems 10 and 22–40. Preferably, the method 350 graphically displays the data in the particular window (not shown) on the display 18. In a preferred embodiment, the user, such as a network administrator, selects the systems 10 or 22–40 which are of interest. The method 350 will preferably be performed for only those selected systems. Also in a preferred embodiment, the data set for a particular system 10 and 22–40 includes a plurality of values for at least one monitor. The monitor will be graphed versus a parameter. In a preferred embodiment, the parameter is time. Thus, a data set preferably contains the values of a monitor corresponding to particular times. In a preferred embodiment, the method 350 is carried out by software residing on the user's system 10.

The user sets a threshold via step 352. In a preferred embodiment, the threshold is a value that the monitor of interest should not exceed. In alternate embodiments, the user could also select a minimum threshold, or both a minimum and maximum threshold. The threshold is, therefore, a measure of the performance of a system 10 or 22–40.

Steps 354 through 362 of the method 350 correspond to steps 102 through 110 of the method 100. Consequently, the average value over an interval for each system 10 and 22–40 of interest is calculated and plotted using a first symbol via steps 352 through 362. In a preferred embodiment, the first symbol is a dash. Also in a preferred embodiment, the first symbol is an icon allowing additional information to be displayed when selected by the user.

If it is determined in step 360 that average value of the last system for the interval has been plotted, then via step 364 the global average for the interval is calculated from the average values. The global average value may therefore be a measurement of the performance of the network 20 as a whole over the interval. In a preferred embodiment, the global average is calculated by summing the average values for each system 10 or 22–40 for the interval and dividing by the number of systems 10 or 22–40 selected. The global average value is plotted using a second symbol via step 366. The second symbol is preferably a circle. The second symbol may also be a second icon, allowing for additional information to be displayed when the second icon is selected by the user. Consequently, when a user views the graph generated by the method 350, the user will be able to distinguish the global average for the network 20 from the average value for a particular system 10 or 22–40.

A vertical bar is then plotted for the interval via step 368. The vertical bar connects the maximum and minimum average values for the interval. In a preferred embodiment, the vertical bar is also an icon. Therefore, when the user selects the icon, additional information can be displayed. For example, the maximum and minimum average values for the interval and the systems 10 and 22–40 having the maximum and minimum average values for the interval can be displayed when the user selects a vertical bar corresponding to a particular interval.

It is then determined via step 370 if data for the last interval has been plotted. If not, then the method 350 moves to the next interval via step 372. Steps 352 through 370 are then repeated for the next interval. As a result, the average values and global average value are calculated and plotted for each interval. In addition, a vertical bar connecting the minimum and maximum average values for each interval is plotted.

If it is determined in step 370 that data for the last interval has been plotted, then the global averages are connected and the threshold plotted via step 374. A user is optionally allowed to view a plot for one of the systems 10 or 22–40, view data for one system 10 or 22–40 by selecting the system 10 or 22–40, view the minimum and maximum and the systems having the minimum and maximum for an interval, or view the frequency distribution graph, via step 376. Preferably, the user is allowed to view one of the above features, or other features, not shown, by selecting the appropriate icon.

Figure 4A:
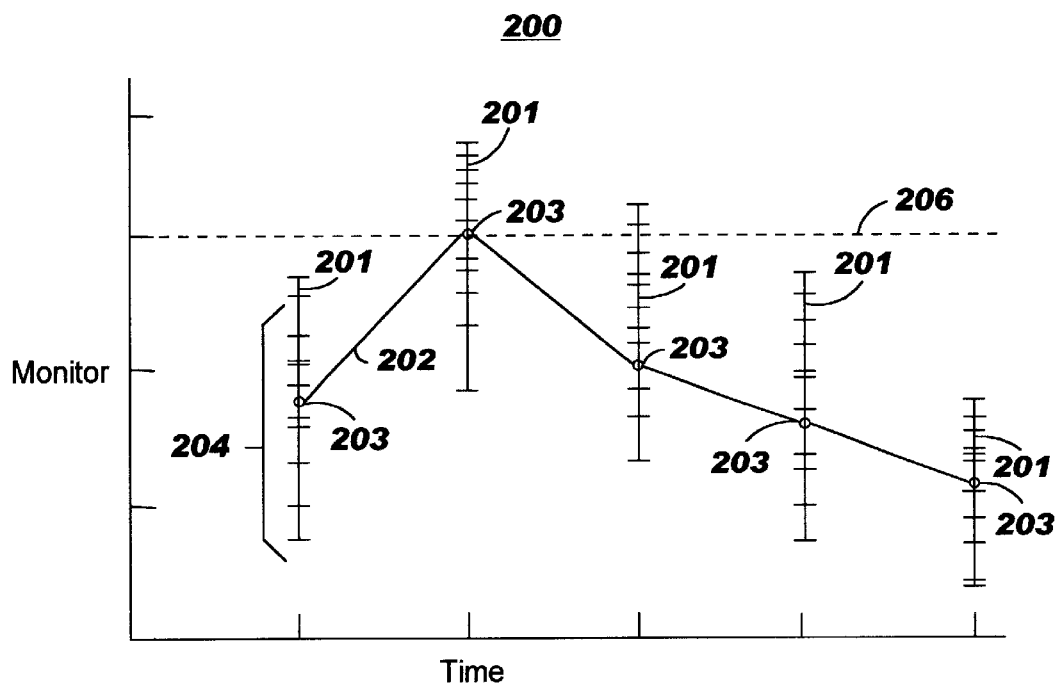
FIG. 4A is a graphical display of a monitor versus time and the threshold plotted generated in accordance with the present invention.

FIG. 4A depicts one embodiment of a graph 200 plotted using the method 350. Preferably, the graph 200 is also plotted only if the user has selected a sufficient number of systems 10 and 22–40, as discussed with respect to the method 300. Referring to FIG. 4A, the graph 200 depicts a monitor versus time. The scale for the monitor is shown on the vertical axis of the graph 200. The horizontal axis displays the user-selected intervals. Thus, the horizontal axis could be in any of a number of intervals including minutes, days, or weeks.

The graph 200 includes sets of dashes 204 representing the average values for each system 10 or 22–40 that was selected at each interval. Thus, in the graph 200, the first symbol is a dash. Because the average values for individual systems 10 or 22–40 are not connected, the graph 200 is easier for a user to read. In a preferred embodiment, the first symbol is an icon. Thus, when a user selects one of the dashes 204, more information is displayed. In one embodiment, the user selects one of the dashes 204 by placing a curser (not shown) on a particular one of the dashes 204. In one embodiment, when a user selects one of the dashes 204, the present invention displays the name of the systems 10 or 22–40 which have the minimum and maximum average values for that interval in a bubble (not shown) on the display 18. In another embodiment, in response to a user selecting one of the dashes 204, the present invention may display information for system 10 or 22–40 corresponding to the dash 204 selected.

A vertical bar 201 at each interval connects the dashes 204 at each interval. By looking at the vertical bar 201, it is easy for a user to determine the minimum and maximum average values at a particular interval. Thus, the range of average values at a particular interval can be easily determined by a user. In addition, by viewing the density of dashes 204 at a vertical bar 201, a user can determine how the performance of each system 10 or 22–40 selected compares to the global average for the network 20 and to the threshold 206.

Also depicted are the points 203 depicting the global average for each interval. The second symbol in the graph 200 is, therefore, an empty circle. The global averages 203 are connected by a line 202. Because the global averages 203 are connected by a line 202, it is easy for a user to determine the trends in all of the systems 10 or 22–40 selected.

The threshold 206 is depicted using a dashed line. The threshold 206 allows a user to easily determine the number of selected systems 10 or 22–40 that exceed the threshold. For example, if the monitor in the graph 200 is CPU utilization, a user can quickly determine that in second interval, there are several systems 10 or 22–40 that exceed the threshold 206 for CPU utilization. Moreover, a user can determine that the global average CPU utilization for the network 20 also exceeds the threshold. Thus, the user can quickly determine that the performance of the network 20 suffers during the second interval. Performance may be improved by increasing the CPU utilization of those systems 10 or 22–40 which are below the threshold 206. In a preferred embodiment, the user can also change or select the value for the threshold 206 by selecting the threshold 206 on the display 18 and moving the threshold 206 on the graph 200. Preferably, the user selects the threshold 206 on the graph 200 by placing the curser (not shown) on the threshold 206, clicking on a mouse button (not shown), and dragging the threshold 206 up or down.

Figure 4B:
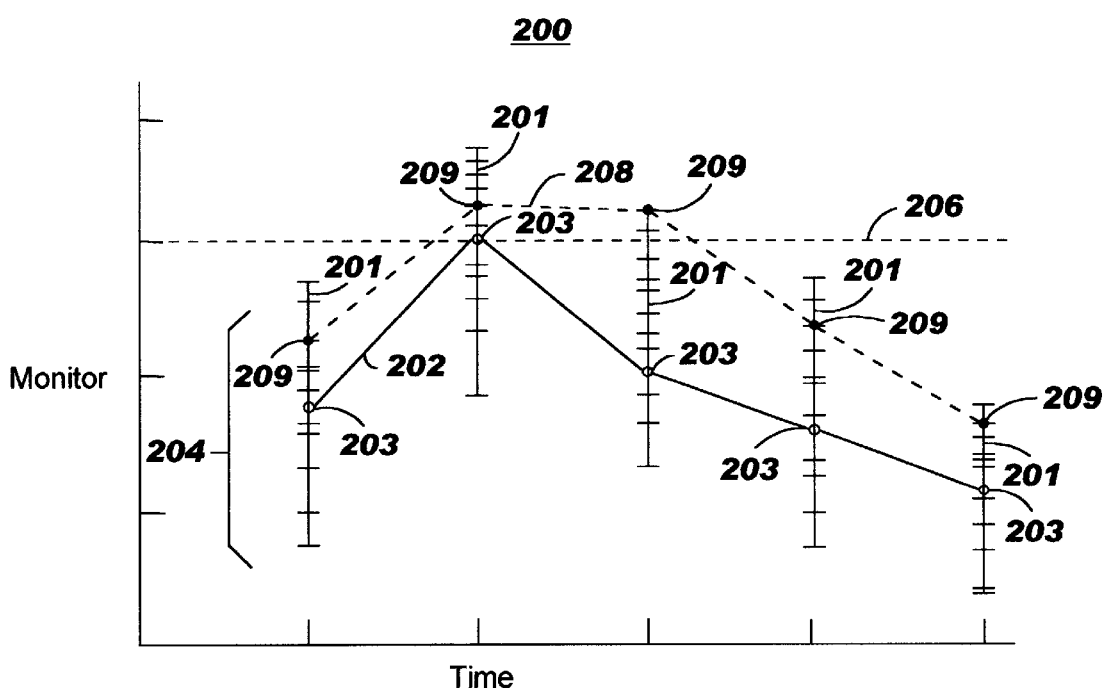
FIG. 4B is a graphical display generated in accordance with the present invention of a monitor versus time and a threshold value, with a plot for a particular system being highlighted.

In a preferred embodiment, the user can also plot an individual system 10 or 22–40. FIG. 4B depicts the graph 200 when the user has selected a particular system 10 or 22–40 for plotting. Preferably, the user selects the particular system 10 or 22–40 by placing the curser (not shown) on a dash 204 for that system 10 or 22–40, and clicks on a mouse button (not shown). In the graph 200, the average values for the particular system 10 or 22–40 selected are marked by closed circles 209. The closed circles 209 are connected by a dashed line 208. As a result, the user can easily compare trends in the particular system 10 or 22–40, shown by the dashed line 208, to overall trends, shown by the line 202.

Figure 5:
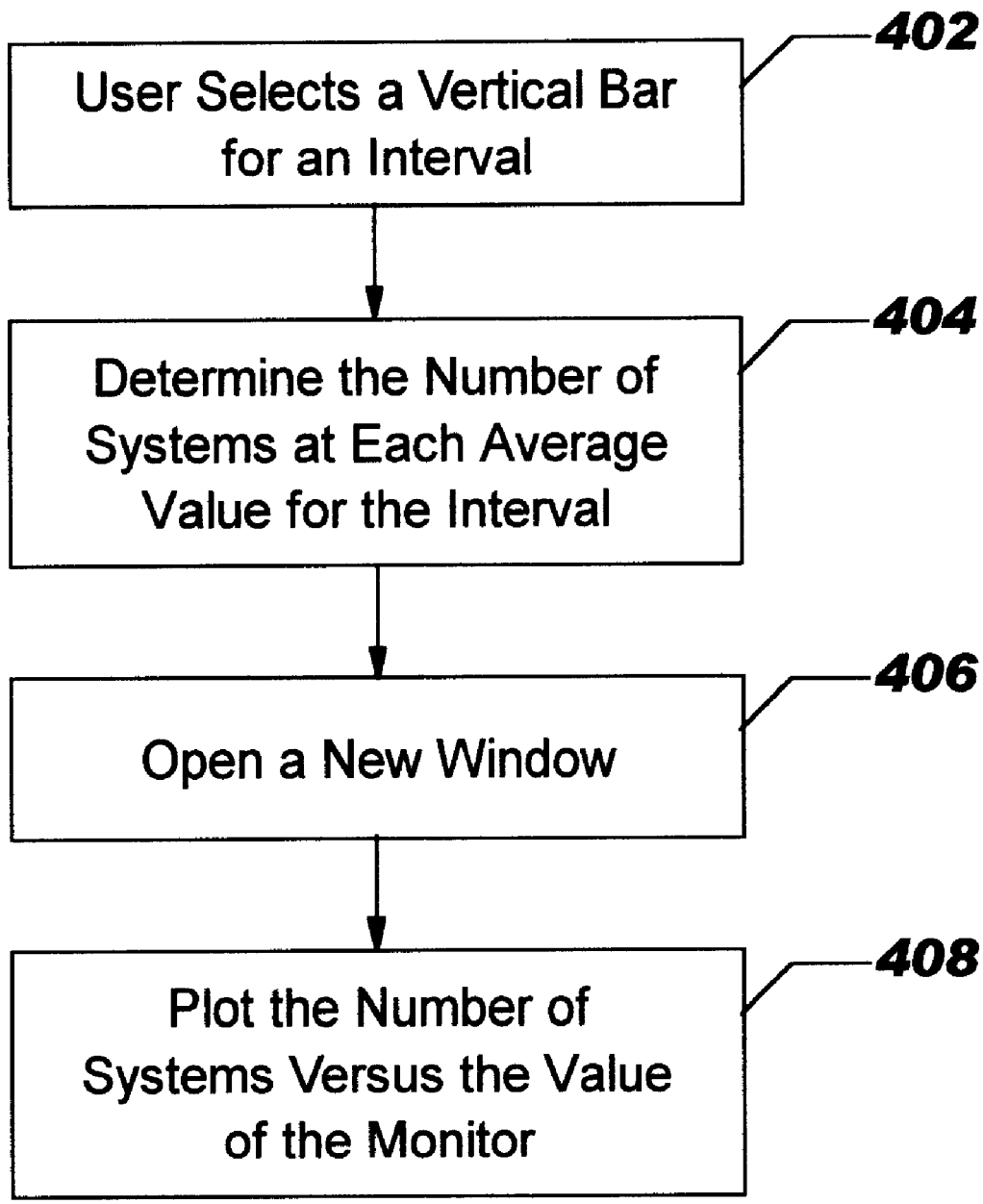
FIG. 5 is a detailed flow chart of a method for generating a graphical display in accordance with the present invention.
Figure 6:
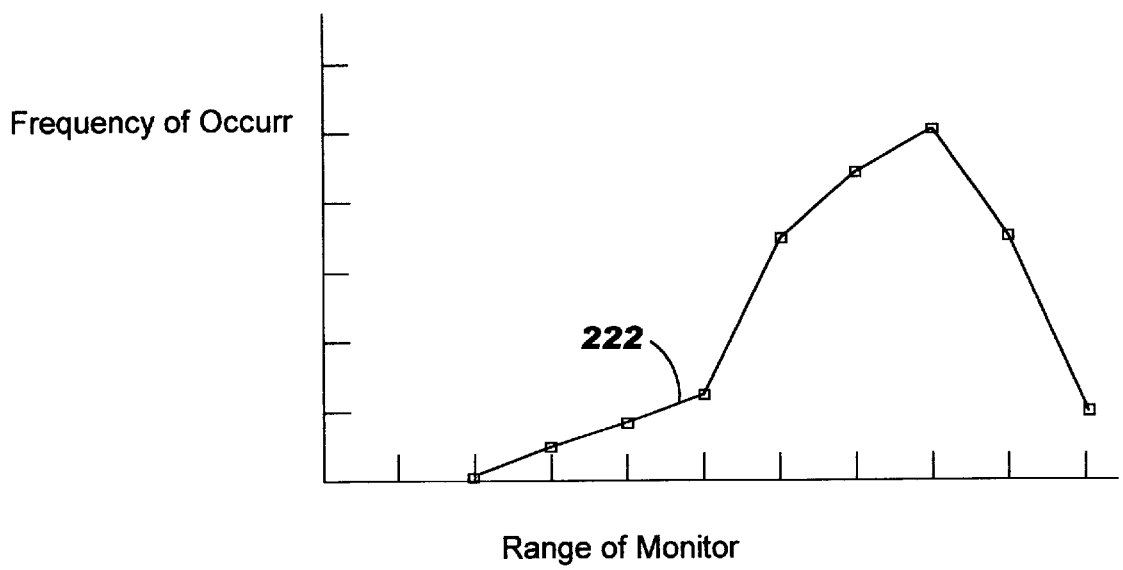
FIG. 6 is a graphical display of the frequency of occurrence versus the range of a monitor provided in accordance with the present invention.

FIG. 5 depicts one embodiment of a method 400 for providing a frequency distribution graph. FIG. 6 depicts one embodiment of a frequency distribution graph 220. The frequency distribution graph 220 is a plot 222 of the frequency of occurrence versus the range of a particular monitor. The frequency of occurrence is the number of systems 10 or 22–40 selected which have a particular value of the monitor.

Referring back to FIG. 5, a user first selects a particular vertical bar 201 for which the user wishes to view a frequency distribution graph, via step 402. In a preferred embodiment, the user selects the particular vertical bar 201 by placing the cursor (not shown) on the particular vertical bar 201 and clicking a mouse button (not shown). The number of systems 10 or 22–40 at each value of the monitor is then determined via step 404. A new window in the display 18 is then opened via step 406. The number of systems 10 or 22–40 versus the value of the monitor is then plotted in the new window via step 408. Thus, the user can view the number of system 10 or 22–40 at each value of the monitor for the particular vertical bar 201.

Thus, a user can easily obtain information from the graphs 200 and 220 depicted in windows on the display 18. The user can easily determine trends in the performance of individual systems 10 or 22–40 or a number of systems 10 or 22–40. In addition, the user can rapidly determine if an individual system 10 or 22–40 or a number of systems 10 or 22–40 exceed a threshold for a particular monitor. The user can quickly and easily gain information on individual systems or the network as a whole.

A method and system has been disclosed for providing a graphical display of a plurality of data sets. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for graphically displaying data from a plurality of selected data sets on a computer system including a display, each selected data set having a plurality of values corresponding to a plurality of parameter values, the method comprising the steps of:

(a) determining a plurality of average values for a plurality of intervals for each selected data set, each of the plurality of average values being determined from a portion of the plurality of values, the portion of the plurality of values corresponding to an interval, each of the plurality of intervals including a portion of the plurality of parameter values;

(b) plotting the average value for each selected data set for each of the plurality of intervals on the display, the average value being depicted as a first symbol;

(c) determining a global average from the average value of each of the plurality of selected data sets for each of the plurality of intervals;

(d) plotting the global average for each of the plurality of intervals on the display as a second symbol; and (e) connecting the second symbol for each of the plurality of intervals with a second symbol from a previous interval of the plurality of intervals.

2. The method of claim 1 further comprising the step of:

(f) marking a threshold value.

3. The method of claim 2 wherein the threshold value marking step (f) further includes the step of:

(f1) plotting a line passing through the threshold value.

4. The method of claim 3 wherein the first symbol is a first icon, the first icon capable of providing additional information relating to the plurality of selected data sets used to determine the icon.

5. The method of claim 4 wherein the second symbol is a second icon.

6. The method of claim 1 wherein each selected data set further corresponds to a system, the method further comprising the steps of:

(f) allowing a user to select a frequency distribution graph for an interval of the plurality of intervals; and (g) displaying the frequency distribution graph, the frequency distribution graph indicating the number of systems at a particular average value.

7. The method of claim 1 wherein each selected data set corresponds to a particular system, the method further comprising the steps of:

(f) allowing a user to select a particular system; and (g) connecting the average value for an interval of the plurality of intervals for the particular system to a previous average value corresponding to a previous interval of the plurality of intervals for the particular system.

8. The method of claim 1 further comprising the steps of:

(f) determining if the graph is to be generated; and (g) performing steps (a) through (e) only if the graph is to be generated as a second symbol; and (e) connecting the second symbol for each of the plurality of intervals with the second symbol from a previous interval of the plurality of intervals.

9. A computer-readable medium containing a program for graphically displaying data from a plurality of selected data sets on a computer system including a display, each selected data set having a plurality of values corresponding to a plurality of parameter values, the program comprising the instructions for:

(a) determining a plurality of average values for a plurality of intervals for each selected data set, each of the plurality of average values being determined from a portion of the plurality of values, the portion of the plurality of values corresponding to an interval, each of the plurality of intervals including a portion of the plurality of parameter values;

(b) plotting the average value of each selected data set for each of the plurality of intervals on the display, the average value being depicted as a first symbol;

(c) determining a global average from the average value of each of the plurality of selected data sets for each of the plurality of intervals;

(d) plotting the global average for each of the plurality of intervals on the display as a second symbol; and (e) connecting the second symbol for each of the plurality of intervals with a second symbol from a previous interval of the plurality of intervals.

10. The computer-readable medium of claim 9 further comprising instructions for:

(f) marking a threshold value.

11. The computer-readable medium of claim 10 wherein the instructions for marking the threshold value (f) further include instructions for:

(f1) plotting a line passing through the threshold value.

12. The computer-readable medium of claim 11 wherein the first symbol is a first icon, the first icon capable of providing additional information relating to the selected data set used to determine the icon.

13. The computer-readable medium of claim 12 wherein the second symbol is a second icon.

14. The computer-readable medium of claim 9 wherein each selected data set further corresponds to a system, the program further comprising instructions for:

(f) allowing a user to select a frequency distribution graph for an interval of the plurality of intervals; and (g) displaying the frequency distribution graph, the frequency distribution graph indicating the number of systems at a particular average value.

15. The computer-readable medium of claim 9 wherein each selected data set corresponds to a particular system, the program further comprising instructions for:

(f) allowing a user to select a particular system; and (g) connecting the average value for an interval of the plurality of intervals for the particular system to a previous average value corresponding to a previous interval of the plurality of intervals for the particular system.

16. The computer-readable medium of claim 9 further comprising instructions for:

(f) determining if the graph is to be generated; and (g) performing steps (a) through (e) only if the graph is to be generated.

* * * * *